United States Patent Office 3,383,346
Patented May 14, 1968

3,383,346
PARTICLE SIZE CONTROL IN SEED TECH-
NIQUE EMULSION POLYMERIZATION US-
ING HYDROXYL GROUP - CONTAINING
MODIFIER
Edwin Studley Smith, Cuyahoga Falls, Ohio, assignor to
The Goodyear Tire & Rubber Company, Akron, Ohio,
a corporation of Ohio
No Drawing. Filed Apr. 7, 1965, Ser. No. 446,434
13 Claims. (Cl. 260—23)

This invention relates to the manufacture of a plastisol resin and to a method of controlling the size distribution of the resin particles during the polymerization of a polymerizable monomer in an aqueous dispersion.

The size of the polymer particles in a latex has an important effect upon the physical properties of the latex such as initial viscosity, surface tension, heat stability and upon films made therefrom such as clarity and gloss.

These properties are obtained to a large extent when the plastisol resin latex contains an optimum size distribution of the resin particles to permit the packing of as large an amount of resin solids into as small a space as possible. Under these conditions, the dry resin recovered from the latex will possess a suitable low viscosity when made into a plastisol using a minimum amount of plasticizer. It is observed that in order to get close packing of the solid phase a range of particle sizes is required. A uniform particle size of about 1 micron produces dilatancy. Experience has shown that it is desirable to produce a range of resin particle sizes from about 0.1 micron to about 1.0 and up to as high as 1.25 microns. Particles larger than 1.25 microns may be present but not in number by more than 20% of the total number of particles present in the latex. Particles smaller than 0.1 micron may be present but not more than 5% by weight may have a diameter less than 0.05 micron. Particle sizes larger than this will give lower viscosity plastisols but time and temperature requirements for fusion are not practical and the resulting product is undesirable in regard to clarity.

It is observed that in an emulsion polymerization reaction, there are dispersed in the water phase monomer droplets, polymer particles and surfactant micelles. It is further observed that in order to produce resin particles of a certain size, best results are obtained when the polymerization reaction medium is first provided with a certain amount of seed material, an example being seed particles of the polymer desired. It then becomes necessary to cause this seed material to grow in size by causing polymerization of the monomer absorbed thereon to polymerize to polymer thereby adding to the weight of the particle. It is also observed that maximum growth of the seed material is insured if the polymerization can be conducted under conditions where the initiation of new seed particles is held to a minimum. This requires control over the number of monomer droplets formed and over the number of surfactant micelles formed. Since the only time that a new particle is not initiated is when the free radical collides with a polymer particle thus initiating polymerization of the monomer absorbed on the particle the problem becomes one of increasing the collisions between the initiator radical and the polymer particles and on the other hand decreasing collisions between the initiator radical and the monomer droplets and between the initiator radical and the micelles.

Since new particles may be formed in the surfactant micelle, attempts have been made to limit the initiation of new particles by adding only enough surfactant to maintain a concentration of surfactant below that necessary to form micelles. This procedure alone does not produce the desired size distribution of the resin particles. Moreover, sufficient surfactant must be present in order to insure stability of the latex.

A further attempt to limit the initiation of polymer particles in an aqueous emulsion polymerization system was to maintain the initiator concentration at a minimum on the theory that half of the particles present including the monomer droplets, the polymer particles and the surfactant micelles are active at any given instant during the polymerization reaction and half are inactive during this same period. Therefore, at any given instant the proportions of old particle growth to new particle initiation dependent only on the ratio of polymer particles to the total number of monomer droplets and micelles present in the reaction medium and independent of initiator concentration. However, since the formation of a particle is irreversible then over a period of time there will be more new particles initiated the higher the initiator concentration. Also in an emulsion polymerization reaction at any given temperature, the reaction rate is proportional only to the number of particles and accordingly there will be no decrease in reaction rate by reducing the initiator concentration except insofar as the number of particles are affected. However, even with this attempt to limit initiator concentration, it still was not practical to produce a large particle size latex having properties which adapted it especially to the manufacture of plastisols.

Another method for controlling the size of the polymer particles being formed is to provide a predetermined number of polymer particles early enough in the polymerization reaction so that their size may be increased through further polymerization of monomer absorbed on their surfaces although it is immaterial whether the polymer particles be initiated in the same reaction vessel in which the polymerization to final product is carried out or whether the particles be introduced into the reaction medium as a "seed" charge of a previously prepared polymer latex. The latter technique is the preferred system in practice since this method insures the presence of an exact quantity of polymer particles of a certain size.

Other seed materials having a diameter of less than 1.25 microns that may be used are those that are wettable by the monomer being polymerized, capable of having polymers formed on the surface of the seed material and will not interfere with the polymerization reaction. The seed material may be selected from chemical compositions of the following classes including elements such as carbon black, metal powders including titanium, copper, brass, gold and stainless steel; oxides such as ferric oxide, silicon dioxide and titanium dioxide; carbonates such as lead and calcium carbonates; phosphates such as lead and calcium; silicates such as clay and glass beads; chromates such as lead chromate; and organic compounds such as Prussian blue and gamboge; sulfates such as barium lauryl sulfate; barium sulfonates of organic materials such as dodecyl benzene sulfonate, metal salts such as silver chloride, and other well known inert filler materials including the titanates and talc. Heat stabilizers which are inert toward the polymerization reaction including basic lead salts may be used. Insoluble peroxides such as barium peroxide can be used and which may also function as initiators. Calcium silicate which is porous and capable of absorbing monomer may also work in this invention.

Seed material of a polymeric nature includes saturated resinous polymers of monomeric materials in which the predominant constituent is vinyl chloride or vinylidene chloride, and saturated resinous polymers of monomeric materials in which the predominant constituent is styrene or other alkenyl substituted aromatic compound. Still other saturated resinous polymers may also be utilized as long as the seed is not soluble in the monomer. For example, saturated polymers of monomeric materials in which the predominant constituent is a nitrile of an alpha-methylene aliphatic monocarboxylic acid such as acrylonitrile, methacrylonitrile, ethacrylonitrile, alpha-chloro acrylonitrile and the like are quite suitable.

It is theorized that as the concentration of seed particles decreases, the theoretical product diameter of the seeded latex increases. Also as the ratio of seed particles to the other particles present including the micelles and the monomer droplets is lowered, the initiation of new particles is promoted. Thus it may be reasoned that these two competing forces suggest that there will be an optimum seed concentration to insure maximum growth and minimum formation of new particles which may also be referred to as fines in contrast to the larger particles desired. Depending upon the size of the seed the amount used will range from about 0.01% to about 50% and preferably from about .05% to about 25% of seed polymer by weight based on the weight of polymer present in the final polymer latex. The larger the seed the greater will be the amount needed in order to have the desired number of polymerization sites.

The effect of variations in seed concentration can be shown by comparing average diameters ($D_v$) and efficiency factors (E. F.) with seed concentrations. The $D_v$ is defined as the diameter of that particle for which the product of its volume and the total number of particles present equals the total volume of material. This may be expressed by the formula $V = n \cdot a \cdot (D_v)^3$ (where $a = \frac{1}{6}\pi$ and $n$ is the total number of particles present). The efficiency factor (E. F.) is defined as a ratio of the number of polymer particles in the product latex to the number in the seed latex. This factor is determined from the theoretical and actual $D_v$ for the product latex. If theoretical $D_v$ has been attained there would be the same number of particles initially as finally and the total volume of the polymer fraction of the product latex would be $$V_1 = N_i \cdot a \cdot (D_v)^3$$

(theoretical). For the experimental situation where a lower than theoretical $D_v$ is obtained then $$V_2 = N_I \cdot a \cdot (D_v)^3$$

(actual). Since $V_1 = V_2$ and $N_i \cdot a \cdot (D_v)^3$ (theoretical) $= N_f \cdot a \cdot (D_v)^3$ (actual) on the basis that there is the same amount of polymer in each case then E. F. by definition $= N_f / N_i$.

Another possibility of limiting the initiation of new polymer particles resides in the manner in which the monomer is introduced to the polymerization reaction medium. Since polymerization may take place in the monomer droplet then it is desirable to limit the number of monomer droplets. However, it is necessary that sufficient monomer droplets be present in the reaction medium to insure saturation of the polymer seed centers with reactable monomer. Thus a minimum number of monomer droplets is necessary throughout the reaction medium in order to insure saturation of the polymer particles with monomer. However, even when keeping the monomer concentration at the minimum necessary to maintain the reaction rate the initiation of new particles continues throughout the reaction to an undesirable extent thus interfering with the production of the proper size distribution of the final resin particles. The number of monomer droplets produced in the reaction medium is dependent to some extent upon the rate of mechanical agitation of the reaction medium but again it is necessary that the medium be agitated as by stirring with a conventional propeller type stirring mechanism to prevent excessive stratification of the medium. Even under these conditions of controlled agitation and control of the amount of monomer present in the medium undesirable fine particles are produced thus preventing the production of a large number of large particles in the latex.

It has now been discovered that an unexpected control over the formation of an excessive number of fine particles may be exercised by adding a modifier to the reaction which is believed to adjust the viscosity of the monomer being polymerized without interfering with any of the other desirable attributes possessed by a commercially feasible reaction medium in the production of large particle size latices. A modifier of this nature is one that does not promote the establishment of micelles, does not hinder or interfere with the polymerization of the monomer, remains in the monomer during polymerization, has no appreciable effect on the electrical properties of the polymer or degrade the heat stability of the polymer or add color to the polymer or otherwise appreciably harm the physical properties of the polymer including its tensile strength, initial viscosity, shelf life, inherent viscosity and ability to be ground to a fine powder.

A highly commercially acceptable plastistol resin is produced by adding a saturated alcohol having the general formula $R(OR')_nOH$ to the reaction medium. In the formula $n$ is a whole number of 0 through 5, R is a hydrocarbon radical containing from 8 to 28 carbon atoms and R' is ethylene or propylene. When $n$ is 0 the alcohols may be represented by the general formula $C_nH_{2n+1}OH$ wherein $n$ has a value ranging from about 8 to about 28 with a preference in the area of 12. Lauryl alcohol is a preferred alcohol in the present invention and may be commercially purchased as a mixture of lower and higher alcohols ranging in carbon content from about $C_8$ to about $C_{14}$. Cetyl alcohol may also be used and it is not necessary that these alcohols be pure but rather may be mixtures of higher and lower carbon content alcohols. These alcohols may be used in amounts ranging from about .5 to about 5 parts per 100 parts of monomer to be polymerized. The specific nature of the alcohol dictates the amount to be used in any given reaction medium since the alcohol is believed also to have some effect on the ability of the surfactant to form micelles as well as adjust the viscosity of the monomer being polymerized. Other aliphatic alcohols that may be used in the present invention are the ethylene oxide adducts of the above named alcohols. The adducts are also known as alcohol ethers wherein an oxygen linkage is present in the hydrocarbon portion of the alcohol and which may be represented by the general formula $R(OR')_nOH$ wherein R is a hydrocarbon radical containing from 8 to 28 carbon atoms and wherein $n$ is a whole number from 1 through 5. Representative members of these alcohol ethers are $C_8H_{17}OCH_2CH_2OH$;

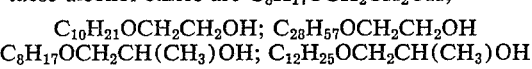

$C_{10}H_{21}OCH_2CH_2OH$; $C_{28}H_{57}OCH_2CH_2OH$
$C_8H_{17}OCH_2CH(CH_3)OH$; $C_{12}H_{25}OCH_2CH(CH_3)OH$ and $C_{18}H_{37}OCH_2CH(CH_3)OH$. These alcohol ethers are made by reacting the corresponding alcohol with the ethylene oxide in the presence of a basic medium above a pH of 7.1.

The following example illustrates a manner of making the latex of this invention having a desirable size distribution of the resin particles, wherein one-half of the lauryl alcohol is charged initially and the remainder is added with the monomer, all parts being by weight unless otherwise indicated.

Example 1

The following formula was used in making a plastisol resin wherein 80% of the particles by number have a diameter not greater than 1.25 microns and not more than 5% of the particles by weight have a diameter less than .05 micron.

| | Parts by weight |
|---|---|
| (1) Water | 8,280 |
| (2) Sodium persulfate | 4 |
| (3) Sodium bicarbonate | 15.3 |
| (4) Seed latex (25.9% polyvinyl chloride solids) | 115 |
| (5) Lauryl alcohol | 46 |
| (6) Solution A (total charged) | 4,536 |
| (7) Solution B (total charged) | 1,348 |

The above first 5 ingredients are charged to a 5-gallon reactor which is evacuated to remove air. The temperature of the reactor is adjusted to 115° F. and mild agitation at the rate of 85 r.p.m. is turned on. 336 parts of solution A is then added which is sufficient to bring the vapor pressure to operating pressure less 5 p.s.i. Solution A is then added at a rate of 308 parts per hour for six hours and then at a rate of 392 parts per hour for six additional hours. During this 12 hour period and for an additional 2½ hours solution B is added at a rate of 93 parts per hour which is equivalent to .414 part per hour of sodium lauryl sulfate. At 2¼ hours and at 5½ hours, 32 parts of seed latex is added. At 8¾ hours 45 parts seed latex is added. At the end of 17 hours the reaction pressure has dropped to 50 lbs. per square inch and the reactor is vented and degassed. The product has an average particle size ($D_{vs}$) of 0.56 micron. When all of the 92 parts of lauryl alcohol was added at the beginning of the polymerization the end product had a $D_{vs}$ of 0.60 micron. When no lauryl alcohol was added at any time during the reaction the resulting product had a $D_{vs}$ of 0.432.

Solution A consists of 46 parts of lauryl alcohol dissolved in 4,540 parts of vinyl chloride. Solution B consists of 20 parts of sodium lauryl sulfate dissolved in 4,540 parts of water. The seed latex is made in accordance with the following formula:

| | Parts |
|---|---|
| Water | 200 |
| Sodium lauryl sulfate | 3 |
| Sodium bicarbonate | 0.25 |
| Sodium persulfate | 0.30 |
| Vinyl chloride | 100.00 |
| Sodium thiosulate | 0.50 |

The above materials are charged to a conventional reactor and heated to 115° F. to a latex solids content of 25.9% containing seed particles of a diameter of less than 1.25 microns and having a $D_{vs}$ of 0.195 micron.

The following example shows in greater detail another method of preparing a plastisol resin having a desirable size distribution of the resin particles, wherein all of the lauryl alcohol is added initially, all parts being by weight unless otherwise indicated.

Example 2

The following formulation was used in this example:

| Ingredients: | Amount |
|---|---|
| Vinyl chloride | 100 |
| Sodium carbonate | 0.35 |
| Sodium lauryl sulfate | 0.14 |
| Potassium persulfate | 0.25 |
| Sodium thiosulfate | 0.1 |
| Lauryl alcohol | 2.0 |
| Water | 182.0 |
| Seed latex (dry bases) (as prepared in Example 1) | 1.05 |
| Temperature ° F | 115 |
| Agitation (6″ propeller and 6″ Brumagim stirring up with 2 baffles on reactor wall) r.p.m | 85 |
| Sodium lauryl sulfate post stabilizer | 0.1 |

The polyvinyl chloride seed latex was introduced at intervals of 2 and 4 hours to the reaction mixture in an amount of 0.26 part for each introduction. The total seed used contained $1.66 \times 10^{16}$ particles. The vinyl chloride monomer was metered continuously into the reaction vessel over 5.25 hours and the surfactant solution was continuously metered into the reaction vessel starting at the same time the vinyl chloride monomer was started over a period of 8.75 hours. After 10.25 hours, the polymerization was essentially complete as indicated by a pressure drop in the reaction vessel to 50 lbs. per square inch. The reaction mixture was then degassed and stabilized by the addition of 0.1 part of sodium lauryl sulfate.

Electron-microscopy examination of the latex produced in accordance with the foregoing formulation indicates that the particles are spheres having a maximum size of about 0.8 to about 0.9 micron and the resin particles conform to the following size distribution. The $D_{vs}$ of the resulting latex was 0.60 micron.

The following rheological data was obtained on the latex made in Example 2 on a Brookfield viscometer at 6 and 60 r.p.m.

RHEOLOGICAL DATA

Viscosity (6/60 r.p.m.):
| | |
|---|---|
| Initial | 7000/4500 |
| After 1 wk. | 15500/12000 |
| After 2 wks. | 16000/12100 |
| After 2 mos. | 31600/27200 |

The rheological data indicated above was obtained on polymer prepared by coagulating a sample of the latex produced above by first diluting the latex to 10% solids and then heating the diluted latex to 80° C. for 10 minutes and then cooling to 40° C. and coagulating with 4 parts of calcium chloride, followed by filtration, washing with water and then drying at 125° F. and pulverization in a hammer mill. The resulting polymer was then made into a plastisol by the addition of 60 parts of dioctyl phthalate and 2 parts of Advawet X-212 by stirring in a Kitchen Aid Mixer for 10 minutes.

The method of this invention is applicable to those monomeric materials which contain a single methylene group attached to a carbon atom by a double bond; that is, compounds which contain a single $CH_2{:}C{<}$ group, and which undergo addition polymerization in aqueous dispersion to form high molecular weight linear polymers. The most important class of such materials consists of monomers containing a single olefinic double bond present in a $CH_2{:}C{<}$ group, in which the second carbon atom is attached by at least one of the two valences to an electro-negative group, that is; a group which increases substantially the polar characteristics of the molecule. Among such monomers are styrene, p-chlorostyrene; esters of alpha methylene aliphatic mono carboxylic acid, such as methyl acrylate, ethyl acrylate, n-butyl acrylate, isobutyl acrylate, dodecyl acrylate, 2-chloroethyl acrylate, 2-chloropropyl acrylate, 2,2′-dichlorisopropyl acrylate, phenyl acrylate, cyclohexyl acrylate, methyl alpha chloro acrylate, methyl methacrylate, ethyl methacrylate, methyl ethacrylate; acrylonitrile, methacrylonitrile; acrylamide; vinyl esters, such as vinyl acetate, vinyl chloroacetate, vinyl propionate, vinyl butyrate; vinyl halides, such as vinyl chloride or vinyl bromides; vinyl ethers such as vinyl methyl ether, vinyl isobutyl ether, vinyl 2-chloroethyl ether; vinyl ketones, such as vinyl methyl ketone, vinyl hexyl ketone, methyl isopropenyl ketone; ethylene; isobutylene; vinylidene halides, such as vinylidene chloride, vinylidene chlorofluoride; N-vinyl compounds, such as N-vinyl pyrrole, N-vinyl carbazole, N-vinyl indole, N-vinyl succinimide; and other similar polymerizable materials. The method of this invention is particularly applicable to those monomers that form polymers which monomers and polymers are mutually insoluble.

Free radical polymerization initiators useful in emulsion polymerization include the peroxygen type compounds ammonium persulfate, sodium perborate, potassium persulfate, sodium persulfate and potassium percarbonate.

Any surfactant ordinarily employed in the emulsion polymerization of the foregoing polymerizable monomers may be used and in amounts sufficient to stabilize the latex against coagulation and below the critical micelle concentration. Samples of surfactants are fatty acid soaps such as sodium laurate, sodium myristate, sodium palmitate, soaps from fatty acids of tall oil or mixtures thereof; alkali metal sulfates derived from fatty alcohol containing at least 10 carbon atoms such as sodium lauryl sulfate, potassium myristyl sulfate, and the like; alkali metal sulfonates derived from aryl sulfonic acids such as sodium naphthalene sulfonate, sodium isopropyl naphthalene sulfonate, sodium di-isobutyl naphthalene sulfonate, sodium lauryl benzene sulfonate, and the like; salts of high molecular weight organic bases such as cetyl trimethyl ammonium sulfate and the like. Although the surfactants may be used in the present invention, some are more desirable than others because they produce a more facile, efficient and economical process particularly with regard to promoting a high percentage conversion.

The polymerization of the polymerizable monomers listed above may be conducted batch-wise or continuously. It is more convenient to conduct the polymerization batch-wise since it is easier to control the variables involved. The polymerization conditions are conventional in all respects with the exception that the emulsion system contains components within certain narrow limits and agitation is controlled in such a manner as to bring about the desired latex particle sizes when the system contains a material of the type described hereinbefore wherein it is believed that the function of the material is to affect the viscosity of the monomer being polymerized in such a way as to regulate the number of monomer droplets resulting in the system under given conditions of agitation.

While certain representative embodiments and details have been shown for the purpose of illustrating the invention, it will be apparent to those skilled in this art that various changes and modifications may be made therein without departing from the spirit or scope of the invention.

What is claimed is:

1. In the process of preparing a polymer latex having polymer particles of a size wherein 80% by number have a diameter not greater than 1.25 microns and at least 95% by weight have a diameter of at least 0.05 micron in an aqueous dispersion of a polymerizable monomer containing a single olefinic double bond wherein the dispersion contains a surfactant in an amount at all times sufficient to stabilize the latex and in a concentration below that necessary to form micelles in the water phase, a water soluble free radical initiator, seed material of an average diameter of less than 1.25 microns and present in an amount of from about 0.01% to about 50% of the weight of polymer present in the final polymer latex and being of a composition wettable by the monomer being polymerized and insoluble in the monomer under conditions of polymerization and capable of having polymer formed thereon, the improvement which comprises adding an alcohol having the chemical formula $R[OR']_nOH$ wherein R is a hydrocarbon radical containing from 8 to 28 carbon atoms, R' is a radical selected from the group consisting of ethylene and propylene and $n$ is a whole number less than 6 and including 0 and present in an amount from about 0.5 to 5 parts per 100 parts of monomer being polymerized.

2. The process of claim 1 wherein the alcohol is a mixture of fatty alcohols predominantly lauryl alcohol.

3. The process of claim 1 wherein the polymerizable monomer is vinyl chloride.

4. The process of claim 3 wherein the alcohol is lauryl alcohol.

5. The process of claim 1 wherein the alcohol is the reaction product of lauryl alcohol and ethylene oxide.

6. The process of claim 1 wherein the alcohol is an alcohol of the general formula $C_nH_{2n+1}OH$ wherein $n$ has a value of from 8 to 28.

7. The process of claim 6 wherein the polymerizable monomer is vinyl chloride.

8. The process of claim 7 wherein the seed material is polyvinyl chloride.

9. The process of claim 8 wherein the surfactant is a fatty acid soap.

10. The process of claim 9 wherein the surfactant is sodium lauryl sulfate.

11. The process of claim 10 wherein the free radical initiator is a peroxygen compound.

12. The process of claim 11 wherein the free radical initiator is sodium persulfate.

13. The process of claim 12 wherein a total of $1.66 \times 10^{16}$ seed particles were used.

References Cited

UNITED STATES PATENTS

| | | | |
|---|---|---|---|
| 2,520,959 | 9/1950 | Powers | 260—92.8 |
| 2,729,627 | 1/1956 | Carr | 260—92.8 |
| 3,107,237 | 10/1963 | Smith | 260—92.8 |
| 3,208,965 | 9/1965 | Kuhne | 260—30.6 |
| 3,226,350 | 12/1965 | Smith et al. | 260—29.6 |
| 3,291,768 | 12/1966 | Pfluger et al. | 260—29.6 |
| 3,293,199 | 12/1966 | Abercrombie | 260—17 |
| 3,332,918 | 7/1967 | Benetta et al. | 260—85.5 |

FOREIGN PATENTS 698,359 10/1953 Great Britain.

DONALD E. CZAJA, *Primary Examiner.*

R. A. WHITE, *Assistant Examiner.*

UNITED STATES PATENT OFFICE
CERTIFICATE OF CORRECTION

Patent No. 3,383,346                            May 14, 1968

Edwin Studley Smith

It is certified that error appears in the above identified patent and that said Letters Patent are hereby corrected as shown below:

Column 3, line 40, "$V_2 = N_I \cdot a \cdot (D_V)^3$" should read -- $V_2 = N_f \cdot a \cdot (D_V)^3$ --. Column 5, line 33, "Sodium thiosulate ----0.50" should read -- Sodium thiosulfate ------- 0.05 --.

Signed and sealed this 16th day of December 1969.

(SEAL)
Attest:

Edward M. Fletcher, Jr.                 WILLIAM E. SCHUYLER, JR.
Attesting Officer                          Commissioner of Patents